United States Patent

Bower et al.

[11] Patent Number: 4,658,579
[45] Date of Patent: Apr. 21, 1987

[54] LOAD SHARING FOR ENGINE NACELLE

[75] Inventors: Charles R. Bower, Middletown; Frank L. Fowler, Guilford, both of Conn.

[73] Assignee: United Technologies Corporation, Hartford, Conn.

[21] Appl. No.: 718,184

[22] Filed: Mar. 29, 1985

Related U.S. Application Data

[63] Continuation-in-part of Ser. No. 514,201, Jul. 14, 1983, abandoned.

[51] Int. Cl.⁴ ............................................... F02K 3/02
[52] U.S. Cl. .................................. 60/226.1; 60/39.31
[58] Field of Search ................ 60/226.1, 39.31, 39.32, 60/262; 244/54; 248/554

[56] References Cited

U.S. PATENT DOCUMENTS

| | | | |
|---|---|---|---|
| 2,936,978 | 5/1960 | Lauck | 60/39.31 |
| 2,936,999 | 5/1960 | Coar et al. | 415/134 |
| 3,459,460 | 8/1969 | Kopp | 60/232 |
| 3,675,418 | 7/1972 | Lenkeit et al. | 60/39.31 |
| 3,844,115 | 10/1974 | Freid | 60/39.32 |
| 4,013,246 | 3/1977 | Nightingale | 248/554 |
| 4,022,018 | 5/1977 | Tuten et al. | 60/39.31 |
| 4,266,741 | 5/1981 | Murphy | 248/554 |
| 4,326,682 | 4/1982 | Nightingale | 248/554 |
| 4,428,189 | 1/1984 | Greenberg et al. | 60/39.31 |
| 4,441,313 | 4/1984 | Joubert et al. | 60/262 |
| 4,458,863 | 7/1984 | Smith | 244/54 |
| 4,471,609 | 9/1984 | Porter et al. | 60/39.31 |

Primary Examiner—Carlton R. Croyle
Assistant Examiner—Donald E. Stout
Attorney, Agent, or Firm—Norman Friedland

[57] ABSTRACT

The moment induced by the thrust load of a gas turbine engine housed in a nacelle are reacted by tying the nacelle to the engine's fan casing and transmitting the load rearwardly from the thrust linkage through the fan case, through the nacelle cowling and through the thrust load sharing adaptor link, to the engine turbine case.

4 Claims, 4 Drawing Figures ly experienced during high power conditions. This moment creates a load that bears on the engine cases causing the same to deflect. Obviously, such a condition can lead to severe problems particularly to the blades of the rotating machinery.

LOAD SHARING FOR ENGINE NACELLE

CROSS REFERENCE TO RELATED APPLICATION

This is a Continuation-in-Part of U.S. application Ser. No. 514,201, now abandoned, filed on July 14, 1983.

This invention relates to the invention disclosed in copending patent application entitled LOAD SHARING FOR ENGINE NACELLE and filed by Charles R. Bower and Frank L. Fowler on July 14, 1983 and assigned to the same assignee as this application.

TECHNICAL FIELD

This invention relates to aircraft engine nacelles and particularly to means for preventing blade rubbing due to engine case deflections.

BACKGROUND ART

A problem that has been persistent in engines is that during high power operations, particularly during excursions, the typical engine mounts adapted to carry the thrust loads produce a moment around the point of attachment to the engine, which impart an uneven load on the engine cases such as the fan case, turbine case and the like. Since the shaft and bearings do not necessarily see this deflection, this load has been known to cause severe rubbing of the blades in a fan-jet engine, and can be intolerable particularly during engine ground test in an engine test rig.

We have found that we can obviate this problem by uniting the fan inner and outer ducts if they are not already in that condition and tie the nacelle cowling attached to the fan case to the engine rear mounting rail in such a manner as to produce a couple around the point where the thrust load is producing the moment. The tie down mechanism is mounted so that it is in tension and reacts to the load and hence shares the load to effectively cancel it out and relieve the stresses on the engine cases. It is contemplated by virtue of this invention that the engine can be ground tested with its flight nozzle in place which was not the case heretofore. The load sharing mechanism of this invention can be easily adapted to accommodate changes due to wear and varying tolerances. In accordance with this invention the load sharing mechanism does not interfere with the opening and closing of the conventional clam-shell doors of the nacelle and requires no wrenches or the like for the attachment.

DISCLOSURE OF INVENTION

An object of this invention is to provide for a fan-jet engine and its nacelle improved load sharing means. A feature of this invention is to transmit the load imparted by the moment created by the thrust linkage mounting the engine to the aircraft pylon, or to ground in ground, testing through the skin of the nacelle back into the engine through a releasable link so as to relieve the loads on the engine fan case, and avoid blade rubbing. A feature of this invention is that the releasable mechanism tying the nacelle to the engine requires no tools for actuation, and that the mechanism is relatively simple and inexpensive while allowing ground testing when the engine's exhaust nozzle is assembled thereto.

Other features and advantages will be apparent from the specification and claims and from the accompanying drawings which illustrate an embodiment of the invention.

BRIEF DESCRIPTION OF DRAWINGS(S)

BEST MODE FOR CARRYING OUT THE INVENTION

While in its preferred embodiment this invention is described as applied to an engine and nacelle adapted to be tested in a ground test stand, however, as would be obvious to one skilled in this art, this invention can be utilized for flight hardware. It should be recognized that because the nacelle and engine is affixed to a test stand grounded to a fixed structure, the nacelle and engine when affixed to aircraft is grounded to the movable aircraft. This occasions different load characteristics and the actual hardware in the aircraft design situation could be smaller and lighter than that employed with the test stand application.

Figures 1, 2:
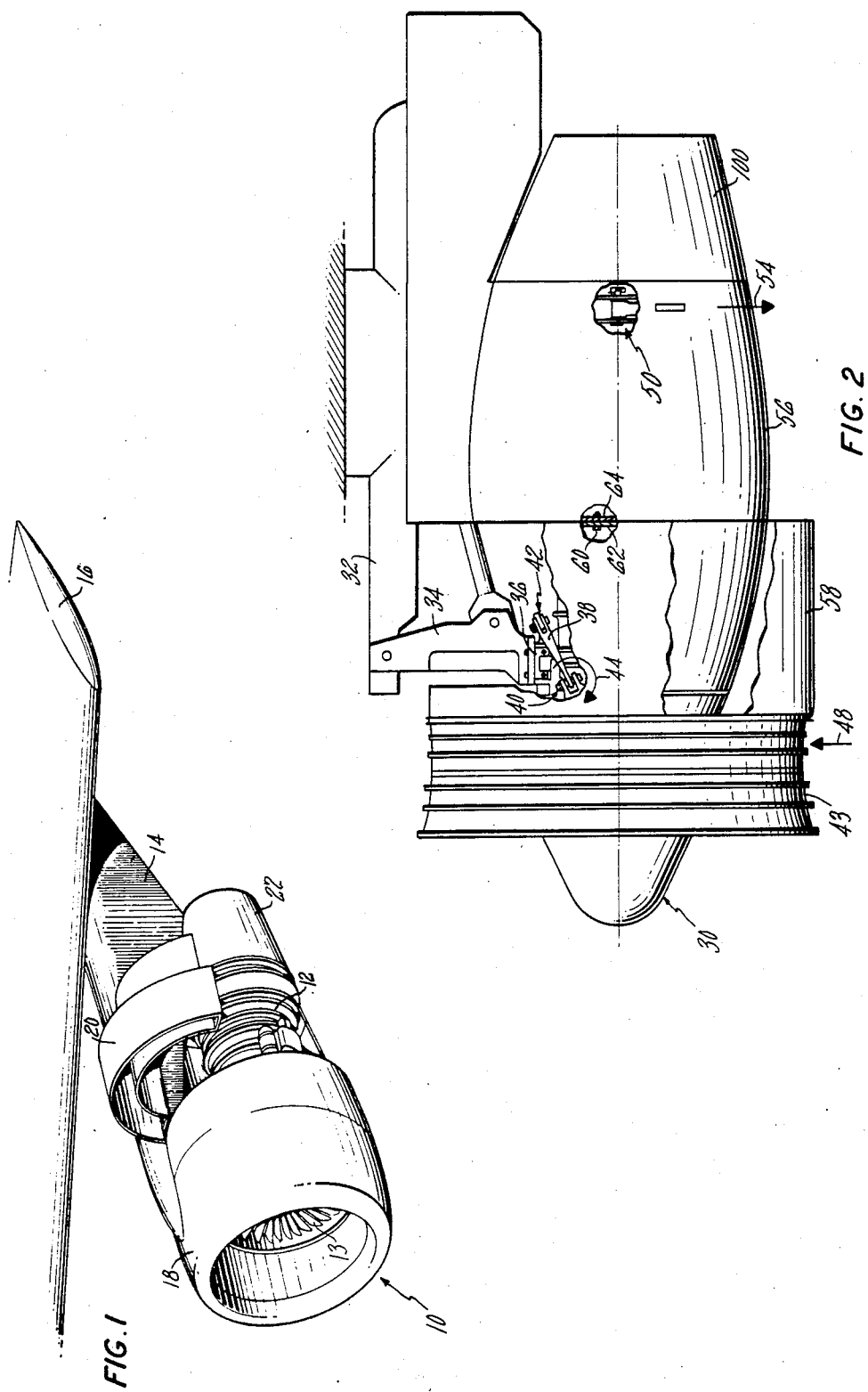
FIG. 1 is a view in perspective showing an engine and nacelle affixed to the aircraft's pylon.
FIG. 2 is a side elevation view showing the engine and a portion of the nacelle affixed to a ground test stand.

As shown in FIG. 1, in the preferred embodiment the nacelle generally indicated by reference numeral 10 housing the fan-jet engine 12 having rotating blades 13 is affixed to the pylon 14 carried underneath the wing 16 of the aircraft (not shown) and is the clam-shell design. For the sake of convenience and simplicity the details of the nacelle and engine are omitted herefrom as they do not constitute a part of the invention but for further details of a suitable engine/nacelle installation reference should be made to the JT9D engine manufactured by Pratt & Whitney Aircraft Group of United Technologies Corporation, the assignee of this patent application, powering the 767 aircraft manufactured by the Boeing Commercial Airplane Company.

Suffice it to say the nacelle consists of various sections, the bellmouth inlet section 18, the clamshell doors 20 and the nozzle section 22.

In FIG. 1 the engine/nacelle installation is shown as it would appear on an aircraft, and in FIG. 2 the engine/nacelle is shown as it would appear on a ground test stand. As noted in FIG. 2 the engine generally indicated by reference numeral 30 is mounted to a beam support structure 32 through the cross beam 34 bolted to the engine interface plate 36. Beam 32 may be secured to the ceiling of a building or other suitable supporting structure. The interface plate 36 and supporting structure merely support the weight of the engine/nacelle assembly and the thrust loads are taken through the link 38 connected to the fan case 43 through the attachment assembly 40 and the support through the attachment assembly 42.

As is apparent in FIG. 2 the bellmouthed inlet section is removed from the nacelle assembly and the fan case 43 of the engine is in view. As stated earlier in this patent application the problem is created because the thrust loads taken up by link 38 is resolved at the attachment point indicated by the arrow 44 which occurs at a point spaced from the engine centerline. This creates a moment which tends to cock or rotate the engine normal to the engine centerline as indicated by the arrow 48. Consequently, the engine cases become distorted and move relative to the rotating blades to cause blade tip rubbing.

This invention obviates that problem by incorporating a load sharing adaptor generally indicated by reference numeral 50 at a point at the rear of the engine (turbine exhaust case) so as to create a reaction force to absorb the load created by the moment as indicated by the vector arrow 54.

Two diametrically opposed attachments are provided to balance the reaction loads on the engine. For the sake of convenience and simplicity only one of the two load sharing adaptors (50) will be described, but it is to be understood that each are identical.

In accordance with the invention, the nacelle core cowling 56 and the nacelle fan cowling 58 are suitably secured to each other by a series of bolts 60 (only one being shown) through complementary flanges 62 and 64 attached to the inner cowlings 56 and 58. Of course, this may not be necessary if both cowlings are formed in a unitary assembly. Thus the load through the thrust link 38 is transmitted to the fan case through the cowling structure to the load sharing adaptor 50.

Figure 3:
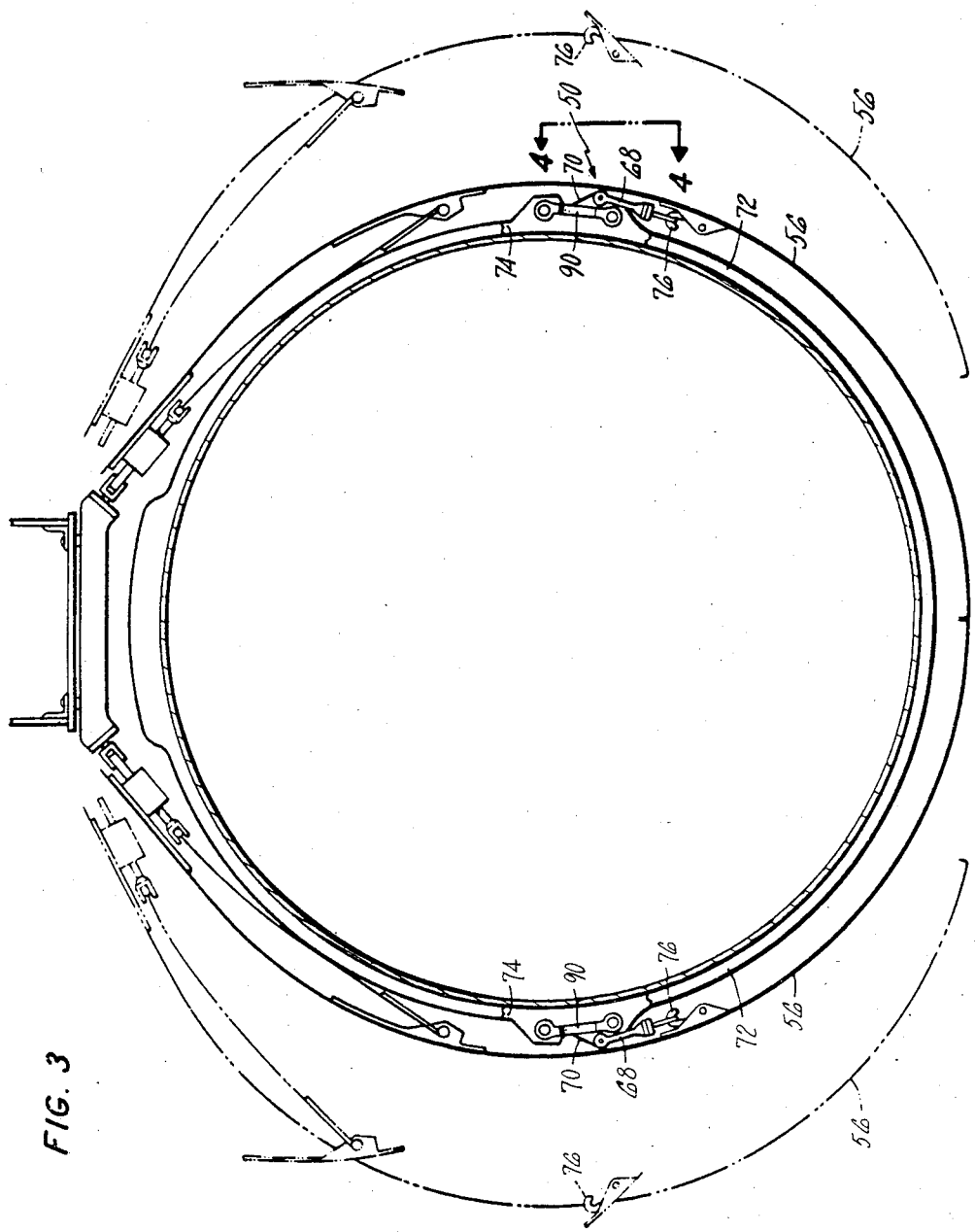
FIG. 3 is a schematic representation of a cross section view of the clam-shell shown in closed and opened positions.
Figure 4:
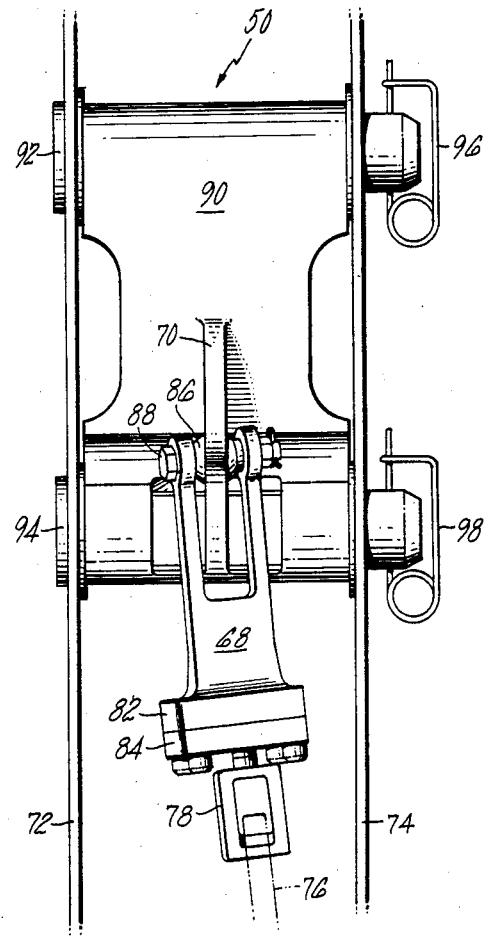
FIG. 4 is a sectional view taken along lines 4—4 of FIG. 3.

The remaining portion of this description will describe the load sharing adaptor which can best be seen in FIGS. 3 & 4. As can be seen in FIG. 3 the load sharing adaptor 50 comprises a strap-like element or link 68 that has one end attached to the gusset 70 that is affixed to the engine attachment rails 72 and 74, and the other end attached to the nacelle cowling 56 through hook 76. Hook 76 and its cooperating eye attachment 78 are commercially available and as noted fit flush with the skin of the nacelle in the closed position.

Cowling 56 is shown in both the closed position and in the open position (in phantom) to demonstrate the load carrying structure.

The strap-like element or link 68 carries an interface end 82 that mates with the flange 84 of the eye attachment 78. The opposite end is bifurcated to receive a universal ball joint 86 secured to the bifurcated end through the pivot bolted connection 88 which in turn mates a bore formed in gusset 70. Gusset 70 is integrally formed in the block 90 that fits between adjacent rails 72 and 74 at ground handling holes already present in engine and secured thereto by pins 92 and 94. The pins are kept from falling out by spring clips 96 & 98 which is shown for ease of assembly and disassembly but a more permanent attachment is contemplated for flight hardware.

As is apparent from the foregoing, the link 68 serves to impart a reaction force to share the load imparted by the thrust link 38 when the engine is operated. Since the loads are transmitted to the engine cases upstream of nozzle/nacelle interface 56/100, it is now possible to test the engine with the flight nozzle 100 (FIG. 2).

While the load sharing concept of this invention doesn't necessarily remove all of the engine case distortions it provides sufficient relief to allow ground testing with a minimal of blade rubbing and allows the engines to be given a higher efficiency rating.

In addition to the advantages enumerated above and without being a limitation thereto, the invention affords these other advantages:

1. Ground test may be done with the flight nozzle intact.
2. The load sharing feature is adjustable for tolerances and wear. This is occasioned by having one end of hook 76 threadably connected to eye assembly 78 so that it can be adjusted to take up the slack occasioned by wear and tolerances in the system.
3. The invention is quick and relatively easy to operate requring no wrenches or special tools, and
4. As been determined by actual tests, the invention is reliable and repeatable.

It should be understood that the invention is not limited to the particular embodiments shown and described herein, but that various changes and modifications may be made without departing from the spirit and scope of this novel concept as defined by the following claims.

We claim:

1. For a gas turbine engine having rotating blades that impart thrust loads and having a centerline, a gas turbine engine case in combination with a nacelle having a fan cowling and a core cowling surrounding said turbine engine case, means for attaching said fan cowling to said core cowling to form a unitary unit, said gas turbine engine having a mounting for being attached to an aircraft and a thrust linkage spaced from the engine centerline so that a load imparted thereto produces a moment that produces distortion on said fan cowling, means for counter-acting said moment including a pair of load sharing adaptors mounted on opposing sides of said gas turbine engine case remote from and downstram of said thrust linkage relative to the working fluid medium in said turbine engine, releasable means attached to said core cowling for connecting said load sharing adaptors and for transmitting the moment imparted by said thrust load through said fan cowling, said core cowling and said pair of load sharing adaptors to said complementary engine case, and said fan cowling and said core cowling forming a force transmitting unit.

2. For a gas turbine engine as in claim 1 wherein at least one of said load sharing adaptors includes a pair of spaced circumferential mounting rails on said turbine engine case, a block-like element supported between said rails to said turbine engine case, a gusset extending radially from said block-like element, a universal ball-like member supported in a bore formed in said gusset and said link interconnecting said universal ball-like member and said releasable means.

3. A system for testing a gas turbine engine having rotating blades that impart thrust loads and having a centerline, said system including a gas turbine engine case in combination with a nacelle having a fan cowling and a core cowling surrounding said turbine engine case, means for attaching said fan cowling to said core cowling, said gas turbine engine having a thrust linkage spaced from the engine centerline such that a load imparted thereto produces a moment that produces distortion on said fan cowling, means for counteracting said moment including a pair of load sharing adaptors mounted on opposing sides of said gas turbine engine case remote from and downstream of said thrust linkage relative to the working fluid medium in said turbine engine, and releasable means attached to said core cowling for connecting said load sharing adaptors and for transmitting the moment imparted by said thrust load through said fan cowling, said core cowling and said pair of load sharing adaptors to said gas turbine engine case, a support for holding said engine in suspended position, and said support being attached to said gas turbine engine case adjacent said thrust linkage for reacting said moment.

4. A system for testing as in claim 3 wherein at least one of said load sharing adaptors includes a pair of spaced circumferential mounting rails on said turbine engine case, a block-like element supported between said rails to said turbine engine case, a gusset extending radially from said block-like element, a universal ball-like member supported in a bore formed in said gusset and said link interconnecting said universal ball-like member and said releasable means.

* * * * *